United States Patent Office 3,365,953
Patented Jan. 30, 1968

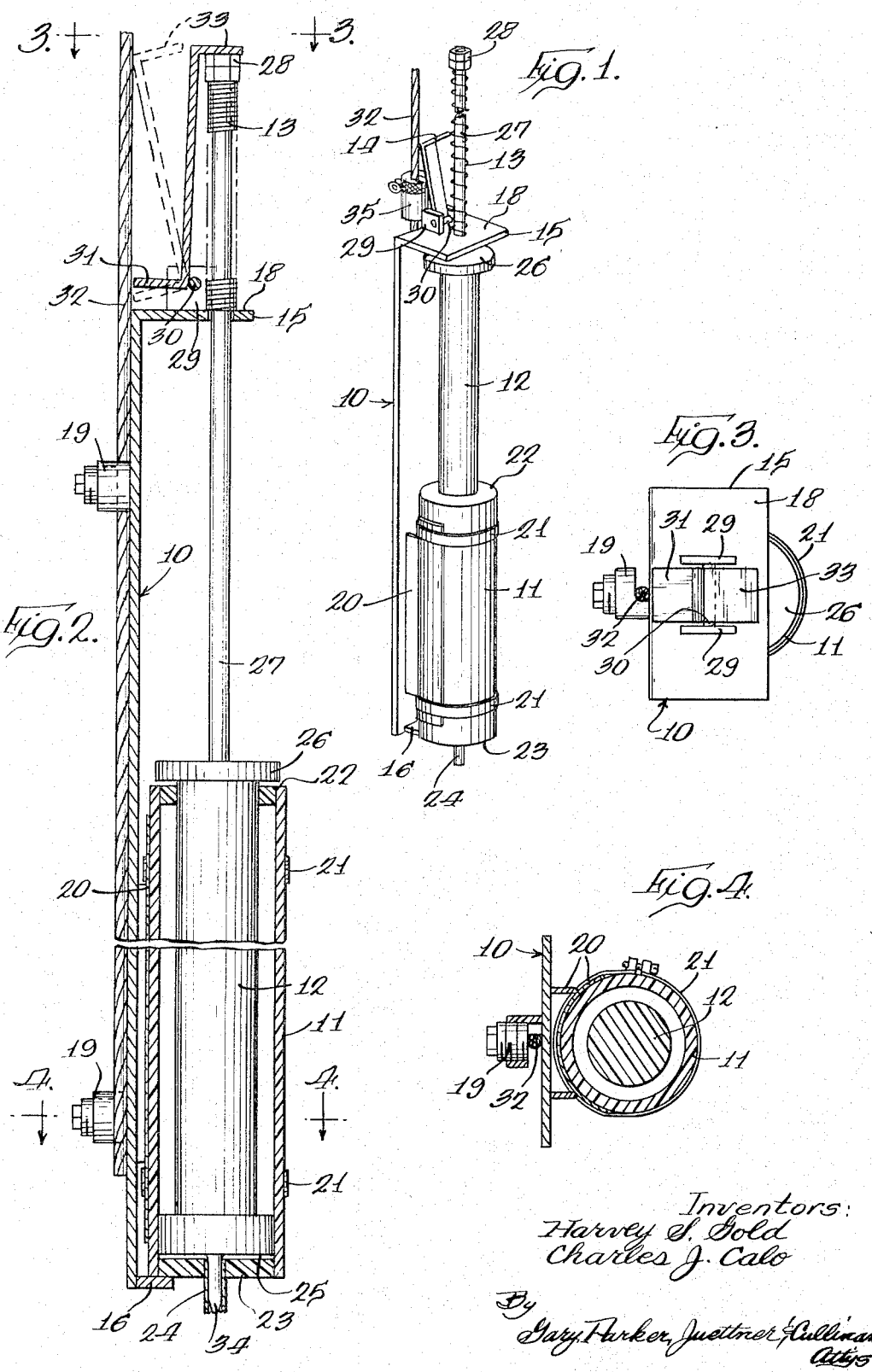

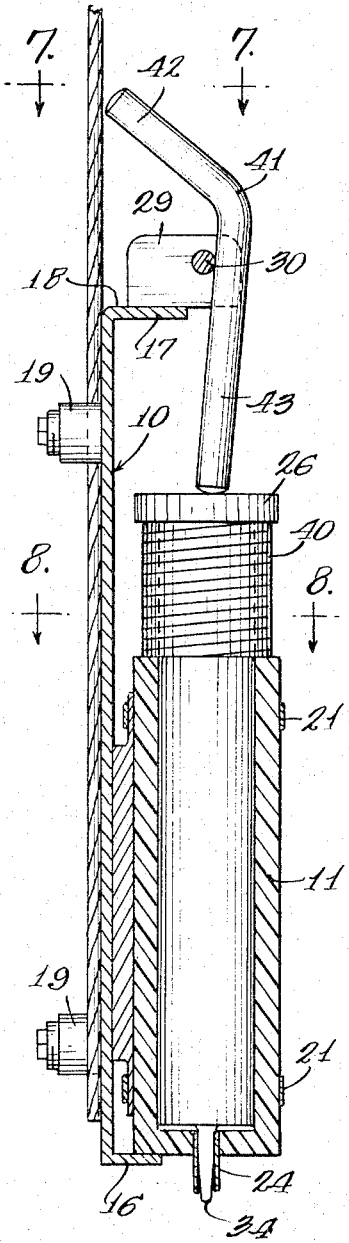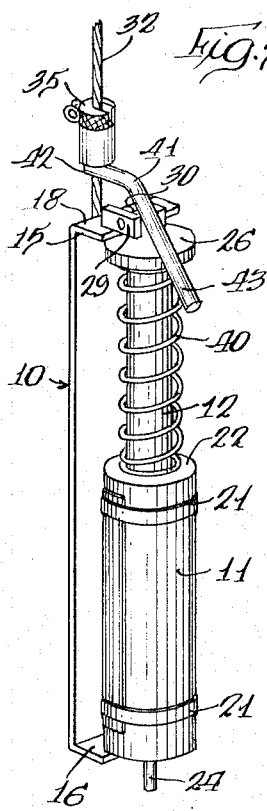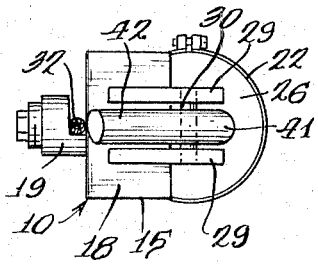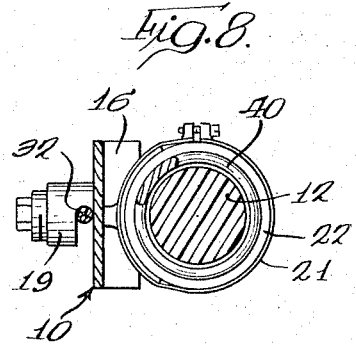

3,365,953
BIOLOGICAL SAMPLER
Harvey S. Gold, Park Forest, and Charles J. Calo, Chicago, Ill., assignors to Velsicol Chemical Corporation, Chicago, Ill., a corporation of Illinois
Filed Nov. 15, 1965, Ser. No. 507,814
2 Claims. (Cl. 73—425.6)

This invention relates to a biological sampler. More specifically this invention relates to an aquatic biological sampler for use with a cable and a messenger.

An aquatic biological sampler is a mechanical device used to sample water and aquatic life contained therein. It is preferable that the samples not be contaminated with water or water- or air-borne organisms from the surface or from a non-desired depth. Several devices are presently available for obtaining uncontaminated samples. These devices generally consist of a glass bottle or rubber bulb or plastic bag held between or around hinged or fixed plates. To actuate the sampler a messenger breaks a sealed glass tube or rubber tubing to allow the sample to enter the bottle, bulb or bag. In the case of the plastic bag device the bag is generally held between two compressed hinged plates which open by spring action to draw the sample into the plastic bag. These presently used samplers have various defects which seriously limit their use. The glass tubes and bottles are subject to breakage especially due to water pressure and are limited or vary in the size of the sample collected. The plastic bag must be sterilized by gas sterilization. The bag is subject to tearing and may not fill or only partially fill when triggered. The device may also trigger prematurely causing the sample to be taken at an undesired depth. Moreover, the hinged plate device is unwieldy, particularly when full, and is often difficult to arm. Rubber bulbs and tubes used in some of the other devices deteriorate upon repeated sterilization. Thus, there is a need for an aquatic biological sampler which does not contain any glass bottles or tubes or thin pliable plastic bags nor require the breaking of glass seals for operation.

Therefore, it is one object of the present invention to provide an aquatic biological sampler of novel construction.

A second object of the present invention is to provide an aquatic biological sampler which is unbreakable and readily sterilized by gas or steam sterilization.

Another object of this invention is to provide an aquatic biological sampler having a positive action wherein failure due to breakage or tearing of brittle or thin parts is virtually impossible.

Still another object of the present invention is to provide an aquatic biological sampler which can be used at any depth to give samples of constant volume.

These and other objects and advantages of the present invention, its details of construction and arrangement of parts, will be apparent from the following specification and accompanying drawings in which:

FIG. 1 is a perspective view of one embodiment of the apparatus of the present invention with the spring and spring retaining means released;

FIG. 2 is a longitudinal cross section of the apparatus of FIG. 1 with the spring compressed and the spring retaining means in operating position, the released position of said means being shown by dotted lines;

FIG. 3 is a top view of the apparatus of FIGS. 1 and 2 taken on line 3—3;

FIG. 4 is a cross section of the apparatus of views 1 and 2 taken on line 4—4;

FIG. 5 is a perspective view of another embodiment of the apparatus of the present invention with the spring and spring retaining means released;

FIG. 6 is a longitudinal cross section of the apparatus of FIG. 5 with the spring compressed and the spring retaining means in operating position;

FIG. 7 is a top view of the apparatus of FIGS. 5 and 6 taken on line 7—7; and

FIG. 8 is a cross section of the apparatus of FIGS. 5 and 6 taken on line 8—8.

Referring to the drawings and particularly to FIG. 1, the apparatus of the present invention comprises an elongated housing 10, a hollow cylinder 11, a piston 12, a compression spring 13, and a compression spring retaining means 14. Advantageously, cylinder 11 and piston 12 can be made of machined plastic, such as polyvinyl chloride, for ease of sterilization, although other materials can be used. More particularly, the elongated housing 10 can have a top 15 and a bottom 16. The top 15 of the housing 10 can have an underside 17 and an upper side 18. The elongated housing 10 also has cable clamping means, such as screw clamps 19, and a cylinder support 20.

The hollow cylinder 11 is positioned within housing 10 and is secured to the cylinder support 20 such as by clamping bands 21. The cylinder 11 has a substantially open top 22 and a bottom 23 terminating in a conduit 24 having a diameter substantially smaller than the diameter of the cylinder 11. Cylinder 11 can also contain an air inlet tube (not shown), disposed through the cylinder wall at a point adjacent the lower end of the piston 12 when the piston and compression spring 13 are in their released position, to assist in removing the sample from the cylinder. This tube would normally be closed off, such as by a clamp.

The piston 12 is disposed within the cylinder 11 with one end 25 adjacent the bottom 23 of cylinder 11. The piston 12 extends through the top 22 of the cylinder 11 to at least a collar 26 disposed outside and above the top 22 of the cylinder 11.

The compression spring 13 is disposed about the piston 12 or an upper extension thereof above the top 22 of the cylinder 11. The compression retaining means 14 is releasable and is secured to the housing 10 or can be secured to the upper side 18 of the top 15 of housing 10. Means 14 retains the compression spring 13 in compression. Compression spring 13 forces the piston 12 into the cylinder 11 with end 25 of piston 12 adjacent the bottom 23 of cylinder 11.

In the embodiment of the present invention shown in FIGS. 1–4 the apparatus also includes a shaft 27 integral with and extending from the collar 26 beyond the top 15 of housing 10 and terminating in a second collar 28. Collar 28 can be formed by one or more nuts threaded on to shaft 27 at the end opposite the end integral with collar 26 as shown. In this embodiment the compression spring 13 is disposed about the shaft 27 between the upper side 18 of the top 15 of housing 10 and the second collar 28. The compression spring retaining means 14 preferably is a lever, as shown, rotatably secured to the upper side 18 of the top 15 of housing 10 such as by walls 29 integral with the upper side 18 and a shaft 30 secured to the lever and rotatably journaled in the walls 29. One portion such as end 31 of the spring retaining lever is positioned adjacent the cable 32 and another portion of the lever such as end 33 is positioned so as to engage second collar 28 to retain the compression spring 13 in compression. The device advantageously can also include an extension 34 integral with the end of piston 12 adjacent the bottom 23 of cylinder 11 which plugs and fills conduit 24. Extension 34 prevents seepage of water into the cylinder 11 and contamination of the cylinder and conduit.

In the operation of the apparatus of the present invention the device is secured to a cable by cable clamping means. This apparatus could be previously sterilized if desired. To arm the apparatus for operation, the piston is depressed into the cylinder thereby compressing the compression spring. To retain the apparatus in this position the compression spring retaining means is secured into operating position. The apparatus is then lowered to the desired depth on the cable. To take the sample, a messenger is sent down the cable to release the compression spring retaining means. Upon the messenger striking the spring retaining means, the compression spring is released urging the piston from a substantial portion of the cylinder until the collar of the piston abuts on the underside of the top of the housing thereby evacuating that portion of the cylinder and simultaneously causing a suction in that portion of the cylinder and the attached conduit. The suction causes a sample of water to be drawn into the evacuated portion of the cylinder and to be held therein.

In the operation of the embodiment of the present invention illustrated in FIGS. 1–4, the apparatus is secured to cable 32 by means of clamps 19. The apparatus is made operable by depressing piston 12 and thus compressing compression spring 13. The compression spring retaining means 14 is positioned over the second collar 28 holding the compression spring 13 in compression. The apparatus is lowered on the cable to the desired depth. When a sample is to be taken, a messenger 35 is sent down the cable to strike end 31 of the compression spring retaining means 14. This action causes the lever to rotate upon shaft 30 disengaging end 33 from the second collar 28 and allowing the compression spring 13 to expand thereby urging the shaft 27 away from the cylinder 11 and urging piston 12 from a substantial portion of the cylinder 11, and extension 34, if present, from conduit 24, until the collar 26 abuts the underside 17 of the top 15 of the housing 10. This action causes a suction to be created in the evacuated portion of cylinder 12 drawing a sample of sea water and marine life contained therein into the evacuated portion of cylinder 11 through conduit 24 and causing the sample to be held therein.

A second embodiment of the apparatus of the present invention is illustrated in FIGS. 5–8. Many of the parts are the same as in the previously described embodiment and have the same reference numerals as in FIGS. 1–4. In this embodiment a compression spring 40 is disposed about the piston 12 between the top 22 of cylinder 11 and the collar 26. Also in this embodiment the compression spring retaining means is a lever 41 rotatably secured to the upper side 18 of the top 15 of housing 10 by a shaft 30 rotatably journaled in walls 29, one end 42 of lever 41 disposed adjacent the cable 32 and the other end 43 engaging the collar 26. To operate this apparatus the device is secured to cable 32 by the clamps 19. The device is then armed for operation by depressing piston 12 into cylinder 11 and placing end 43 of the lever 41 so as to engage the collar 26 and hold the spring 40 in compression. The device is lowered to the desired depth on cable 32. To take a sample a messenger 35 is sent down cable 32 to strike the end 42 of lever 41. Upon the messenger 35 striking the lever 41 the lever disengages the end 43 of lever 41 from the collar 26 permitting spring 40 to expand urging the piston 12 from a substantial portion of the cylinder 11, and extension 34, if present, from conduit 24, until the collar 26 abuts the underside 17 of the top 15 of housing 10. This action causes a suction to be created in the evacuated portion of cylinder 12 drawing a sample of sea water and marine life contained therein into the evacuated portion of cylinder 11 through conduit 24 and causing the sample to be held therein.

While several specific embodiments of this invention are illustrated and described, it will be recognized by those skilled in the art that many modifications and variations of the invention are possible.

We claim:

1. An aquatic biological sampler device for use with a cable and a messenger, said device comprising an elongated housing, means on said housing for securing it parallel to a cable, a hollow sampling cylinder seated in said housing and disposed parallel thereto, a bottom closure for said cylinder including a conduit opening therein and of substantially smaller diameter, a piston reciprocably disposed within said cylinder including a head portion adapted to project closely adjacent said cylinder bottom and an arm portion projecting outwardly of the cylinder including a collar portion, means to limit outward movement of said piston, compression spring means carried by said arm portion normally urging said piston head away from the cylinder bottom, trigger means carried by said housing adapted to yieldably retain said piston urged inwardly against the action of said spring, and means disposed in the path of a messenger descending on said cable whereby the set trigger can be actuated and the compressed spring released to thereby induce suction within said cylinder.

2. The device of claim 1 wherein said trigger means comprises a lever pivoted to said housing and including one arm portion adapted to yieldably retain said piston urged inwardly against the action of said spring and another arm portion disposed in the path of said messenger.

References Cited

UNITED STATES PATENTS 3,277,723 10/1966 Bodman et al. _____ 73—425.4
3,302,464 2/1967 Langguth _____ 73—425.4

LOUIS R. PRINCE, *Primary Examiner.*

S. C. SWISHER, *Assistant Examiner.*